United States Patent
Cheon et al.

(10) Patent No.: US 11,522,718 B2
(45) Date of Patent: Dec. 6, 2022

(54) METHODS OF GENERATING ENCRYPTION KEY AND DIGITAL SIGNATURE BASED ON LATTICES

(71) Applicants: CRYPTO LAB INC., Seoul (KR); SEOUL NATIONAL UNIVERSITY R&DB FOUNDATION, Seoul (KR)

(72) Inventors: Jung Hee Cheon, Seoul (KR); Yongha Son, Seoul (KR); Duhyeong Kim, Seoul (KR)

(73) Assignees: CRYPTO LAB INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 198 days.

(21) Appl. No.: 17/104,987

(22) Filed: Nov. 25, 2020

(65) Prior Publication Data

US 2021/0167969 A1    Jun. 3, 2021

(30) Foreign Application Priority Data

Nov. 28, 2019   (KR) .................. 10-2019-0155709
Nov. 6, 2020    (KR) .................. 10-2020-0147995

(51) Int. Cl.
*H04L 9/00* (2022.01)
*H04L 9/32* (2006.01)
(Continued)

(52) U.S. Cl.
CPC .......... *H04L 9/3247* (2013.01); *H04L 9/0643* (2013.01); *H04L 9/0825* (2013.01); *H04L 9/0866* (2013.01); *H04L 9/0869* (2013.01)

(58) Field of Classification Search
CPC ... H04L 9/3247; H04L 9/0643; H04L 9/0825; H04L 9/0866; H04L 9/0869; H04L 9/30
(Continued)

(56) References Cited

U.S. PATENT DOCUMENTS 5,146,500 A  *  9/1992  Maurer ................. H04L 9/3247
                                                         713/180
7,739,504 B2    6/2010  Futa et al.
(Continued)

FOREIGN PATENT DOCUMENTS

CN      110175473 A      8/2019
WO      2006/114948 A1   11/2006

OTHER PUBLICATIONS

Gentry, G., et al., "How to Use a Short Basis: Trapdoors for Hard Lattices and New Cryptographic Constructions," *Cryptology ePrint Archive*, Report 2007/432, Ver. 20100617:023101, *International Association for Cryptologic Research (IACR)*, 2010, pp. 1-41. https://eprint.iacr.org/2007/432/20100617:023101. 41 Pages.
(Continued)

*Primary Examiner* — Izunna Okeke
(74) *Attorney, Agent, or Firm* — Steinfl + Bruno LLP

(57) ABSTRACT

Disclosed is a method of generating digital signature information comprising: receiving a message; computing a particular solution in which a result of calculating the particular solution in a public key becomes a function-processed output value predetermined in the received message; and generating digital signature information for the message using the computed particular solution, wherein the public key is computed using a ring having a dimension (d) represented by a power of 2 and an integer multiplication of 3 or more.

15 Claims, 6 Drawing Sheets

(51) Int. Cl.
*H04L 9/06* (2006.01)
*H04L 9/08* (2006.01)

(58) Field of Classification Search
USPC .... 713/168, 175, 176, 179, 180; 380/28, 29, 380/30, 44, 47
See application file for complete search history.

(56) References Cited

U.S. PATENT DOCUMENTS

| | | |
|---|---|---|
| 2008/0282089 A1 | 11/2008 | Futa et al. |
| 2018/0309574 A1 | 10/2018 | Lyubashevsky et al. |
| 2020/0259649 A1* | 8/2020 | Garcia Morchon .. H04L 9/0819 |

OTHER PUBLICATIONS

Gur, K.D., et al., "Practical Applications of Improved Gaussian Sampling for Trapdoor Lattices", *IACR Transactions on Cryptographic Hardware and Embedded Systems*, 2018. 22 Pages.

Lyubashevsky, V., "Lattice Signatures Without Trapdoors", *Cryptology ePrint Archive, International Association for Cryptologic Research (IACR)*, 2017, Report 2011/537, Ver. 20171018:150849, pp. 1-24. https://eprint.iacr.org/2011/537/20171018:150849. 24 Pages.

Nguyen, N.K., "On the Non-Existence of Short Vectors in Random Module Lattices," *Cryptology ePrint Archive, International Association for Cryptologic Research (IACR)*, Aug. 2019, Report 2019/973, Ver. 20190829:110909, pp. 1-31. https://eprint.iacr.org/2019/973/20190829:110909. 31 Pages.

Notice of Preliminary Rejection issued by the Japanese Patent Office for JP Patent Application No. 2020-197521 filed on Nov. 27, 2020, on behalf of Crypto Lab Inc et al.. dated Dec. 21, 2021. Japanese Original and English Translation. 15 Pages.

Notice of Preliminary Rejection issued by the Korean Patent Office for KR Patent Application No. 10-2020-0147995 filed on Nov. 6, 2020, on behalf of Crypto Lab Inc et al.. dated Feb. 25, 2022. Korean Original and English Translation. 11 Pages.

Ducas L. et al., "CRYSTALS-Dilithium: A Lattice-Based Digital Signature Scheme" IACR Transactions on Cryptographic Hardware and Embedded Systems, Feb. 2018, 31 pages.

Extended European Search Report for EP Application No. 20210244.8 filed on Nov. 27, 2020 on behalf of Crypto Lab Inc. dated Apr. 20, 2021, 5 pages.

Hower J. et al., "Practical Lattice-Based Digital Signature Schemes" ACM Transactions on Embedded Computing Systems, vol. 14 No. 3, Apr. 2015, 24 pages.

Ducas, L., et al., "Efficient Identity-Based Encryption over NTRU Lattices" *Advances in Cryptology—ASIACRYPT* 2014, pp. 22-41, 20 Pages.

Written Opinion and Search Report issued by the Singapore Patent Office for SG Patent Application No. 10202011677U filed on Nov. 24, 2020, on behalf of Crypto Lab Inc et al. dated Mar. 15, 2022. 7 Pages.

Behnia, R., et al., "Lattice-Based Public Key Searchable Encryption from Experimental Perspectives," in IEEE Transactions on Dependable and Secure Computing, vol. 17, No. 6, Published; Aug. 29, 2018. 14 pages.

Notice of Allowance issued by the Korean Patent Office for Korean Patent Application No. 10-2020-0147995 filed on Nov. 6, 2020, on behalf of of Crypto Lab Inc et al. Issuance Date: Aug. 26, 2622. KR Original + Partial English Translation. 8 Pages.

* cited by examiner

METHODS OF GENERATING ENCRYPTION KEY AND DIGITAL SIGNATURE BASED ON LATTICES

CROSS-REFERENCE TO RELATED APPLICATION(S)

This application is based on and claims priority under 35 U.S.C. § 119 to Korean Patent Application No. 10-2020-0147995, filed on Nov. 6, 2020, in the Korean Intellectual Property Office, which claims the benefit of Korean Patent Application No. 10-2019-0155709, filed on Nov. 28, 2019, in the Korean Intellectual Property Office, the disclosure of which is incorporated by reference herein in its entirety.

BACKGROUND

Field

Apparatuses and methods consistent with the disclosure relate to methods of generating an encryption key and a digital signature based on lattices, and more particularly, to methods of generating an encryption key and a digital signature based on lattices, which are capable of securing parameter flexibility.

Description of the Related Art

Widely known is an encryption method enabling the contents of a digital message (data) not to be known even if a third party steals the message in the process of transmitting and receiving the message. The encryption method may be roughly divided into a symmetric key encryption method and an asymmetric key encryption method.

The symmetric key encryption method is a method in which a key to be encrypted and a key to be decrypted are the same as each other, and the asymmetric key encryption method is a method in which the key to be encrypted and the key to be decrypted are different from each other. In the asymmetric key encryption method, the message may be usually encrypted using a recipient's public key, and the recipient may decrypt the encrypted message using the recipient's secret key.

In the asymmetric key encryption method, a digital signature may be generated on the message to prove the integrity of the message. The digital signature may be usually generated by encrypting a hashed value (integrity check value) of the message using a sender's secret key.

The recipient who received the encrypted message and its digital signature information may obtain the message by performing a decryption using the recipient's secret key, and obtain an integrity check value of the message by decrypting the digital signature information using the sender's public key. The recipient may be confirmed whether the message has not been forged or altered by hashing the obtained message and determining whether its output power value is the same as the value of an integrity check result.

Conventionally, an RSA scheme, an Elgamal scheme and the like have been widely used to generate an asymmetric encryption key. However, due to the advancement of quantum computing technology, there is a high possibility that these conventional encryption methods may be easily disabled.

A trapdoor lattice method has been proposed as a safe method for the quantum computing technology.

In the paper "Efficient Identity-Based Encryption over NTRU Lattices" published in 2014, Leo Ducas et al. proposed a method based on a number theory research unit (NTRU) lattice as one of the methods of generating a secret key and a public key using the identity-based encryption.

A key generation process in the related art may be performed in a polynomial ring ($\mathbb{Z}_q[x]/(x^N+1)$). However, in the related art, a total dimension needs to be a power of 2, and if not, its security has not been proven, and there is a limitation to the parameter flexibility. For example, in order to have increased security than a case where the dimension has a value of 210, the dimension is required to have a value of 211. However, in that case, the dimension has a rapidly increased value of 2048 from 1024, thereby sharply increasing a calculation amount or calculation time, which is required to generate the key.

SUMMARY

Embodiments of the disclosure overcome the above disadvantages and other disadvantages not described above. In addition, the disclosure is not required to overcome the disadvantages described above, and an embodiment of the disclosure may not overcome any of the problems described above.

The disclosure provides methods of generating an encryption key and a digital signature based on lattices, which eliminates parameter rigidity, thereby enabling the flexible selection of a parameter and simultaneously securing its stability.

According to an embodiment of the disclosure, a method of generating a digital signature includes: receiving a message; computing a particular solution in which a result of calculating the particular solution in a public key becomes a function-processed output value predetermined in the received message; and generating digital signature information for the message using the computed particular solution, wherein the public key may be computed using a ring having a dimension (d) represented by a power of 2 and an integer multiplication of 3 or more.

In this case, in the generating of the digital signature information, the digital signature information may be generated by reducing the computed particular solution using a secret key.

Meanwhile, the method of generating a digital signature may further include: computing a trapdoor (T); and determining the computed trapdoor (T) as a secret key.

In this case, the method of generating a digital signature may further include: computing a first random matrix (S) in which the number of columns is smaller than the dimension by 1 and the number of rows is equal to the number of the dimension by sampling elements ($\vec{f}_i$) linearly independent from each other in the ring; computing a second random matrix (A) in which the number of columns is equal to the number of the dimension and the number of rows is 1; and computing the public key based on the second random matrix (A).

In this case, in the computing of the second random matrix, a d×d matrix ($M_i$) may be computed by excluding an i-th row from a matrix $[\vec{f}_1 \ldots \vec{f}_{d-1}] \in R_q^{d \times (d-1)}$, and $(-1)^{i-1} \cdot \det(M_i)$ may be determined as a determinant ($a_i$), thereby computing $a_1^{-1} \cdot (a_1, a_2, \ldots, a_d)$ as the second random matrix.

In this case, the computing of the trapdoor (T) may include sampling of vector ($\vec{F} \in R_q^d$) that satisfies the relationship of $\det[\vec{f}_1 \ldots \|\vec{f}_{d-1}\| \vec{F}] \in = q$, in which $[\vec{f}_1 \ldots \|\vec{f}_{d-1}\| \vec{F}]$ is computed as the trapdoor (T).

In this case, in the sampling of the vector, a result vector value may be output after reducing elements of the vector by using the elements ($\vec{f}_i$).

In this case, in the sampling of the vector, the elements of the vector may be reduced by removing a direction component of the elements by subtracting a constant multiple of the elements ($\vec{f}_i$) from the elements ($\vec{F}=(F_1, \ldots, F_d)$) of the vector.

Meanwhile, in the sampling of the vector, the elements of the vector may be reduced using an extended Euclidean algorithm.

Meanwhile, the predetermined function-processing may be a hash processing.

According to another embodiment of the disclosure, a method of verifying a message includes: receiving a message and digital signature information; checking whether a result of calculating the digital signature information received in a public key becomes a function-processed output value predetermined in the message; determining whether the received digital signature information has a value smaller than a predetermined parameter; and verifying the received message based on the check result and the determination result, wherein the public key may be computed using a ring having a dimension (d) represented by a power of 2 and an integer multiplication of 3 or more.

In this case, the predetermined function-processing may be a hash processing.

According to another embodiment of the disclosure, a calculation device includes: a memory storing at least one instruction; and a processor performing the at least one instruction, wherein the processor may compute a particular solution in which a result of calculating the particular solution in a public key becomes a function-processed output value predetermined in a message, and generate digital signature information for the message using the computed particular solution, and the public key may be computed using a ring having a dimension (d) represented by a power of 2 and an integer multiplication of 3 or more.

In this case, the processor may reduce the computed particular solution using a secret key, and generate the digital signature information by using the reduced particular solution.

Meanwhile, when receiving the message and the digital signature information, the processor may check whether a result of calculating the digital signature information received in a public key becomes a function-processed output value predetermined in the message, determine whether the received digital signature information has a value smaller than a predetermined parameter, and verify the received message based on the check result and the determination result.

According to another embodiment of the disclosure, there is provided a non-transitory computer-readable recording medium comprising a program performing a method of generating a digital signature, wherein the method includes: receiving a message; computing a particular solution in which a result of calculating the particular solution in a public key becomes a function-processed output value predetermined in the received message; and generating digital signature information for the message using the computed particular solution, and the public key may be computed using a ring having a dimension (d) represented by a power of 2 and an integer multiplication of 3 or more.

According to the various embodiments of the disclosure as described above, it is possible to flexibly select the parameter to satisfy the security required for generating the encryption key based on the trapdoor lattice, that is, a total dimension may use an integer rather than a power of 2.

In addition, it is possible to freely select the parameter that are exactly suitable for the security, and it is thus possible to reduce the sizes of all the public key, secret key and encrypted text while increasing the overall efficiency of the encryption system.

Additional and/or other effects and advantages of the disclosure are set forth in part in the description which follows and, in part, are obvious from the description, or may be learned by practice of the disclosure.

BRIEF DESCRIPTION OF THE DRAWINGS

The above and/or other aspects of the disclosure are more apparent by describing certain embodiments of the disclosure with reference to the accompanying drawings, in which.

DETAILED DESCRIPTION

Figure 1:
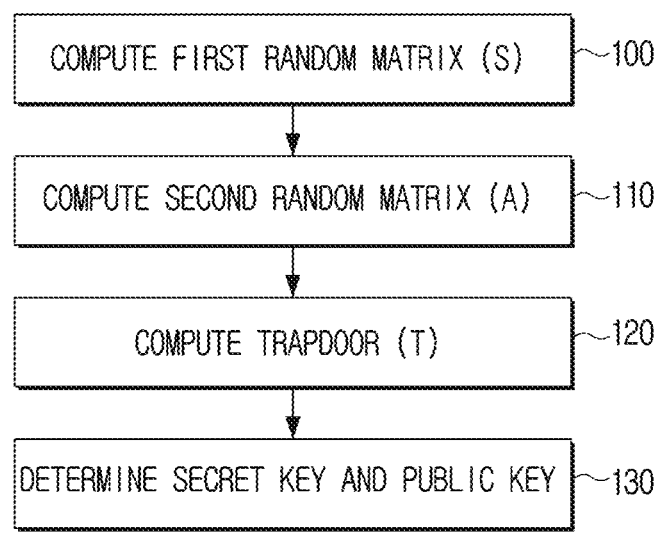
FIG. 1 is a flowchart showing operations of generating a secret key and a public key according to the disclosure.

Hereinafter, the disclosure is described in detail with reference to the accompanying drawings. An encryption/decryption may be used as needed in an information (data) transmission process performed in the disclosure, and all the expressions describing the information (data) transmission process in the disclosure and the claims need to be interpreted as including the encryption/decryption, even though not specifically mentioned. In a disclosure, expressions such as "transmitted (transferred) from A to B" and "received from B to A" may also include transmission (transfer) or reception performed having another medium interposed therebetween, and may not necessarily indicate only the direct transmission (transfer) or reception from A to B.

It needs to be understood that there is no limitation to the order of each step in the description of this specification, unless a preceding step is required to be performed logically and temporally before its subsequent step. That is, except for such an exceptional case, the essence of the disclosure is not affected even if a process described as the subsequent step is performed before a process described as the preceding step, and the scope of the disclosure also needs to be defined regardless of the order of the steps. In addition, "A or B" in the disclosure may be defined to mean not only selectively indicating any one of A and B, but also including both A and B. In addition, the term "including" in the disclosure may comprehensively include other additional elements in addition to the elements listed as including.

The term "module" or "unit" in the disclosure may be general-purpose hardware or software that performs its function, or it may be a logical combination of the hardware and the software.

The disclosure describes only essential components necessary to describe the disclosure, and does not mention components that are not related to the essence of the disclosure. In addition, it should not be exclusively interpreted that the disclosure includes only the mentioned elements, but it should be non-exclusively interpreted that the disclosure may include other elements.

The disclosure may be performed by an electronic calculation device in a mobile device or the like, which may perform an electronic calculation, such as a computer, a server or a smartphone. The mathematical calculation and computation performed in each step of the disclosure, which are to be described below, may be implemented as another calculation in case that a computer program is performed by a known coding method and/or a coding designed to be suitable for the disclosure in order to perform the calculation and computation. A computer program that performs the disclosure may be stored in a computer-readable recording medium.

In addition, the term "value" in the disclosure may be comprehensively defined to include all values that can be represented in mathematical expressions such as vectors, matrices, and polynomials as well as scalar values.

In the disclosure, obtaining a predetermined value by performing a calculation of encryption, hash or the like for a specific value may be defined as including a calculation of encryption, hash or the like for a modified value of the specific value (For example, another value computed through a process in which a predetermined value is additionally calculated on a specific value or the specific value is changed based on a predetermined rule) as well as the specific value.

The mathematical calculation and computation performed in each step of the disclosure, which are to be described below, may be implemented as the computer calculation by a known coding method and/or a coding designed suitable for the disclosure in order to perform the calculation and computation.

Each component of the device shown in the accompanying drawings of the disclosure may have any shape, size and dimension in which a function intended by the disclosure may be performed as well as its shape, size and dimension explicitly shown in the drawings.

A specific equation described below is an equation illustratively described among possible alternatives, and the scope of the disclosure should not be construed as being limited to the equation mentioned in the disclosure.

For the convenience of explanation, the disclosure uses notations decided as follows.

a←D: Element (a) is selected based on distribution (D).
  s1, s2∈R: Each of S1 and S2 is an element in set (R).
  mod (q): Modular is calculated by element (q).
  $\lfloor \cdot \rceil$: An internal value is rounded.

Hereinafter, diverse embodiments of the disclosure are described in detail with reference to the accompanying drawings.

The disclosure proposes a generalized concept of a number theory research unit (NTRU) lattice referred to as a modeled-NTRU (MNTRU) lattice which may solve the dimensional flexibility of an NTRU-based encryption. This MNTRU lattice may show generation of a more efficient trapdoor than an existing NTRU trapdoor. Hereinafter, a new identity-based encryption may be applied first based on the MNTRU trapdoor.

An operation for generalizing the NTRU trapdoor is first described.

Similar to generalization from ring-LWE to module-LWE, the context of an NTRU lattice in $R^2$ may be generalized to an MNTRU lattice of high-level $R^d$.

First, if two small polynomials (f, g) are sampled from matrix $$\left(S_{NTRU} := \begin{pmatrix} g \\ -f \end{pmatrix} \in \mathcal{R}^{2\times 1}\right),$$

f is assumed to be an inverse in the ring, an NTRU instance is defined as h:=g/f∈ $\mathcal{R}_q$ and (1,h)∈ $\mathcal{R}_q^2$ here, Equation 1 may be satisfied as follows.

$$(1,h) \cdot s_{NTRU} = 0 \bmod q \quad \text{[Equation 1]}$$

Here, h is the NTRU instance and SNTRU is a matrix.

In addition, the NTRU lattice may be defined as in Equation 2 below.

$$A_{NTRU} := \{(u,v) \in \mathcal{R}^2 : u + vh = 0 \bmod q\} \quad \text{[Equation 2]}$$

Here, $A_{NTRU}$ is the NTRU lattice and q is a prime number.

This content may be understood as an integer lattice in $Z^{2n}$ including uncommon short vectors (g and −f), and f and g may find F and G∈R, which satisfy following Equation 3, thereby generating the basis $T_{NTRU} \in \mathbb{Z}^{2n\times 2n}$) of an $A_{NTRU}$ trapdoor.

$$gF - fG = q \quad \text{[Equation 3]}$$

Here, g and f are short vectors, F and G are matrices, and q is a prime number.

An NTRU equation is the same as Equation 4 below.

$$T_{NTRU} = \begin{pmatrix} \mathcal{A}(g) & \mathcal{A}(G) \\ -\mathcal{A}(f) & -\mathcal{A}(F) \end{pmatrix} \quad \text{[Equation 4]}$$

Here, A is the anti-circulant matrix transform of the polynomial.

Such a framework may generalize case d≥2. To this end, an element having a small coefficient may first be sampled in $S_{MNTRU} \in R^{d\times(d-1)}$, and it is possible to construct vector $h_{MNTRU} = (h_1, \ldots, h_d) \in R_q^{d-1}$ that satisfies Equation 5 below.

$$(1, h_{MNTRU}) \cdot s_{MNTRU} = 0 \bmod q \quad \text{[Equation 5]}$$

Based on this equation, an n-dimensional MNTRU lattice may be defined as in Equation 6 below.

$$A_{MNTRU,d} := \left\{(u_0, \ldots, u_{d-1}) \in \mathcal{R}^d : u_0 + \sum_{i=1}^{d} u_i h_i = 0 \bmod q\right\} \quad \text{[Equation 6]}$$

Here, h=($h_1, \ldots, h_{d-1}$) may be determined by $det_i/det_1$, and mod q is the determinant of a submatrix where $det_i$ is (d−1)×(d−1) of $S_{MNTRU}$.

Based on this content, the trapdoor of the disclosure may be calculated as in Equation 7.

$$T_{MNTRU} \in \mathbb{Z}^{dn\times dn} = (\mathcal{A}(S) \| \mathcal{A}(F)) \quad \text{[Equation 7]}$$

Here, F is F=($F_1, \ldots, F_d)^t \in \mathcal{R}^d$ and represents the MNTRU equation.

Hereinafter, a lattice structure capable of generating the above-described trapdoor is described with reference to FIG. 4.

Figure 4:
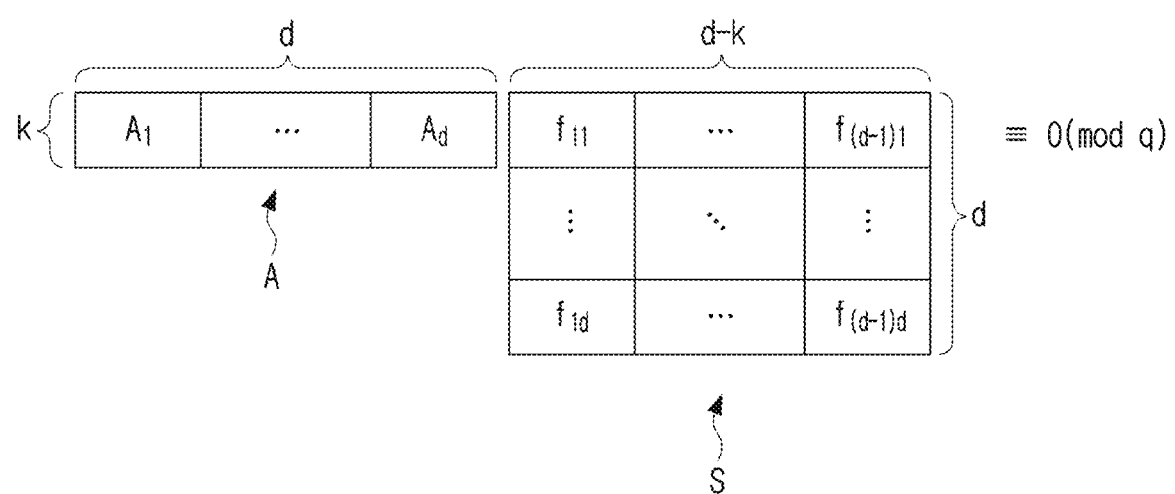
FIG. 4 is a diagram showing a structure of a random matrix of the disclosure.

FIG. 4 is a diagram showing a structure of a random matrix of the disclosure.

Referring to FIG. 4, a first random matrix (S) and a second random matrix (A) are used in the lattice structure according to the disclosure.

In the first random matrix (S), the number of columns is d-k (i.e., d−1), the number of rows (d) is 1, and in the second random matrix (A), the number of columns is (d), and the number of rows (k) is 1. Here, the number of columns (d) may be a predetermined integer greater than 2, and unlike the related art, the entire dimension may be determined to an integer other than a power of 2, thereby increasing parameter flexibility.

The first random matrix (S) and the second random matrix (A) may satisfy the relationship shown in FIG. 4.

Figure 5:
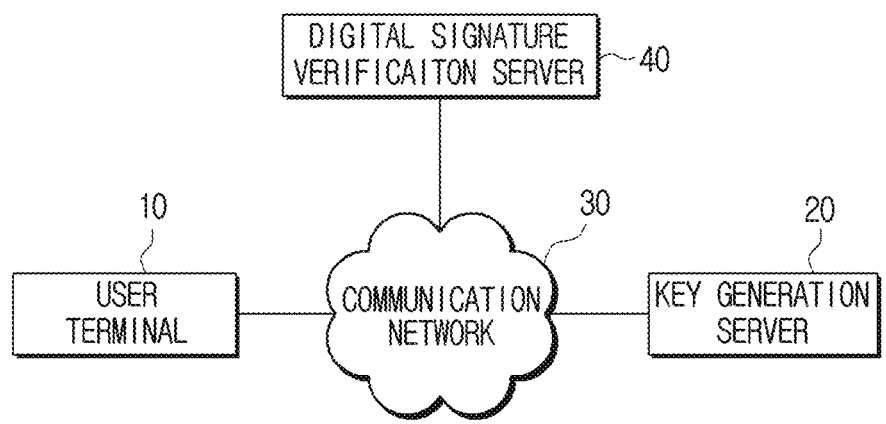
FIG. 5 is a diagram showing a structure of a network system according to an embodiment of the disclosure.

FIG. 5 shows an environment in which a calculation process based on a lattice is performed according to the disclosure.

FIG. 5 is a diagram showing a structure of a network system according to an embodiment of the disclosure.

Referring to FIG. 5, a network system may include a user terminal 10 and a key generation server 20 and a digital signature verification server 40, and each component may be connected to each other through a data communication network 30.

The data communication network 30 may be implemented in various types of wired and wireless communication networks, broadcast communication networks, optical communication networks and cloud networks, and each device may be connected to each other in a way such as wireless fidelity (WiFi), bluetooth, near field communication (NFC) or the like without a separate medium.

The key generation server 20 may generate various key values used for the encryption based on a lattice. In detail, the key generation server 20 may first determine various parameters and rings, and then generate a public key and a secret key, based on the determined parameters and rings.

Here, the ring may be represented by Equation 8 as below.

$$\mathcal{R} := {}^{\mathbb{Z}}[X]/(X^n+1) \qquad \text{[Equation 8]}$$

Here, R is the ring and Z is a coefficient. Here, the ring is a set of polynomials having predetermined coefficients, and may indicate a set in which addition and multiplication between elements are defined and addition and multiplication are closed. This polynomial ring may be referred to as the ring.

Here, the ring is an integer coefficient polynomial ring of less than an Nth order of the elements, and addition and multiplication calculations are defined between the elements in the set. For example, the addition calculation may be defined as a multiplication between polynomials, and the multiplication calculation may be defined as mod $x^N+1$ of the corresponding element after performing the multiplication between polynomials. According to this definition, $X^{N-1} * x$ is $xN$ as the multiplication between polynomials and $X^N = -1$ for mod $X^N+1$, and accordingly, $X^{N-1} * x = -1$.

$$\mathcal{R}_q := \mathcal{R}/q \mathcal{R} = {}^{\mathbb{Z}}[X]/(X^n+1) \qquad \text{[Equation 9]}$$

In Equation 9, the ring is a set of polynomials of only the integer less than the Nth order and having coefficient within [0, q−1]. The addition and multiplication calculations are defined in the set, and for example, it may be defined as performing mod q for each coefficient while simultaneously performing the multiplication calculation for mod $x^N+1$.

The ring according to the disclosure has a dimension represented by the power of 2 and an integer multiplication of 2 or more, and a lattice trapdoor corresponding to such an order value may be used. As described above, it is possible to use the dimension represented by the integer multiplication. Accordingly, there is no need to double the dimension even in a case where the dimension needs to be increased to increase security of the key, and it is thus possible to flexibly select the parameter.

The key generation server 20 may compute the first and second random matrices based on the determined ring described above, and compute the trapdoor. Here, the trapdoor is special secret information that allows the inverse of a function that is difficult to be performed on its own to be calculated. The trapdoor in the disclosure is used in a lattice-based encryption technique as shown in FIG. 4, and its specific computation operation is described below with reference to FIG. 1.

The key generation server 20 may compute the public key and the secret key, based on the computed random matrix and trapdoor. A specific key generation operation is described below with reference to FIG. 1.

In addition, the key generation server 20 may receive an encrypted text from the user terminal 10 and store the encrypted text as it is without performing the decryption.

Meanwhile, FIG. 5 describes that the key generation server 20 generates keys required for the encryption, and the user terminal 10 receives some of the generated keys and then performs the encryption operation. However, the key generation operation, the encryption operation and the decryption operation may be performed in various devices depending on the environment.

The user terminal 10 may generate digital signature information using the public key generated by the key generation server 20, and transmit a message and the digital signature information to the digital signature verification server 40. Here, the digital signature information (or digital signature value) is information used to check whether the message is forged or altered.

The digital signature verification server 40 may receive the message and the digital signature information, and verify the message using the received digital signature information.

A user may input a variety of information through his/her user terminal 10. The input information may be stored in the user terminal 10 on is own, but may be transmitted to and stored in an external device for reasons such as storage capacity and security. In FIG. 5, the key generation server 20 may serve to store such information, and the key generation server 20 may serve to use some or all of the information stored in the key generation server 20.

The user terminal 10 may receive key information required for encryption from the key generation server 20, and may encrypt the message using the received key information. For example, the user terminal 10 may receive the public key from the key generation server 20, and generate an encrypted text by encrypting the message using the received public key. Here, the user terminal 10 may receive and use the small elements required for encryption and a function-processed output value, or may generate and use the encrypted text on its own.

In addition, the user terminal 10 may transmit the encrypted text and the digital signature information to the digital signature verification server 40.

In addition, the digital signature verification server 40 may decrypt the encrypted text. For example, the user terminal 10 may decrypt the encrypted text using the secret key, and the key generation server 20 may perform the decryption operation.

In addition, the digital signature verification server 40 may verify the received message using the received digital signature information.

FIG. 5 shows one user terminal, but a plurality of user terminals may be used. For example, the user terminal 10 may be implemented as various types of devices such as a smartphone, a tablet, a game player, a personal computer (PC), a laptop computer, a home server, a kiosk or the like, and a home appliance to which an internet of things (IoT) function is applied.

FIG. 1 is a flowchart showing operations of generating a public key and a secret key according to the disclosure.

Referring to FIG. 1, a first random matrix (S) is computed (100). For example, the first random matrix (S) may be computed by sampling element values that satisfy Equation 10 below. In detail, the first random matrix (S) in which the number of columns is smaller than the dimension by 1 and the number of rows is equal to the number of the dimension may be computed by sampling elements ($\vec{f}_i$) linearly independent from each other in the ring.

$$\vec{f}_i = (f_{i1}, \ldots, f_{id}) \in R_q^d; i=1,2,\ldots,d-1 \quad \text{[Equation 10]}$$

Here, $\vec{f}_i$ indicates the sampled element values, and all the $\vec{f}_i$ values are linearly independent from each other in $R_q$. If the values are not linearly independent from each other, it is possible to resample element values.

A second random matrix (A) is then computed (110). In detail, the second random matrix (A) may be computed as shown in Equation 11 below by sampling a random coefficient (r) and using a determinant ($a_i$) corresponding to the number of rows of the first random matrix and the sampled random coefficient (r).

$$r \cdot (a_1, a_2, \ldots, a_d) \quad \text{[Equation 11]}$$

Here, the determinant ($a_i$) is $(-1)^{i-1} \cdot \det(M_i)$, and $M_i$ is a $d \times d$ matrix excluding the i-th row ($M_i$) from a matrix $[\vec{f}_1 \ldots \vec{f}_{d-1}] \in R_q^{d \times (d-1)}$. Here, r is a random coefficient $r(\in R_q)$.

For example, if the random coefficient (r) is $a_1^{-1}$, the second random matrix (A) may be $(1, A_1, \ldots, A_{d-1})$.

A trapdoor (T) may then be computed (120). For example, the trapdoor (T) may be computed as shown in Equation 12 below by using the first random matrix (S) and a newly sampled $\vec{F}$.

$$T = [\vec{f}_1 \| \ldots \| \vec{f}_{d-1} \| \vec{F}] \quad \text{[Equation 12]}$$

Here, T is the trapdoor, $\vec{f}_1$ is the element value of the first random matrix (S), and $\vec{F}$ is a short vector sampled from a ring to satisfy Equation 13 below. In addition, "$\|$" indicates concatenation.

$$\det[\vec{f}_1 \| \ldots \| \vec{f}_{d-1} \| \vec{F}] = q \quad \text{[Equation 13]}$$

Here, det is a determinant calculation, is the element value of the first random matrix (S), is the sampled short vector, and q is a constant.

Hereinafter, a specific method of sampling the short vector ($\vec{F}$) is described below.

First, $\alpha_i$ satisfying $$\sum_{i=1}^{d} \alpha_i \cdot res(a_i) = 1$$

may be calculated. Here, $\gcd(res(a_1), \ldots, res(a_d))=1$ and $$res(f) := \prod_{k=0}^{n-t} f(x^{2k+1}) \in Z$$

may be assumed.

$\alpha_i$ may be calculated by an extended Euclidean algorithm. In addition, $F_i$ may be computed as follows based on the above computation values.

$$F_i := q \cdot \alpha_i \cdot \prod_{k=0}^{n-1} a_1(x^{2k+1}) \quad \text{[Equation 14]}$$

In this way, the following relationship in Equation 15 is established.

$$\sum_{i=0}^{d} F_i \cdot a_i = q \quad \text{[Equation 15]}$$

$\vec{F} = (F_1, \ldots, F_d)$ is reduced by using $\vec{f}_i$, and then a result value ($\vec{F}$) may be output.

This reduction indicates a process in which a direction component of $\vec{f}_i$ is removed while subtracting an appropriate constant multiple of $\vec{f}_i$ from $\vec{F} = (F_1, \ldots, F_d)$. This reduction may allow the trapdoor (T) to have a small size. Taking an integer as an example, in case that F=(2, 5) and f=(1, 2), if [F, f] and [F−2f, f] are compared to each other, the same column space may be defined, but a column of the subsequent reduced matrix may have a decreased size.

A secret key and a public key may then be determined (130). In detail, the computed trapdoor (T) may be determined as the secret key, and the public key may be determined as (A1, ..., Ad−1).

If the secret key and the public key are determined in this way, the public key may be disclosed by having a hash function ($H: \{0,1\}^* \to R_q^d$) applied thereto.

Figure 2:
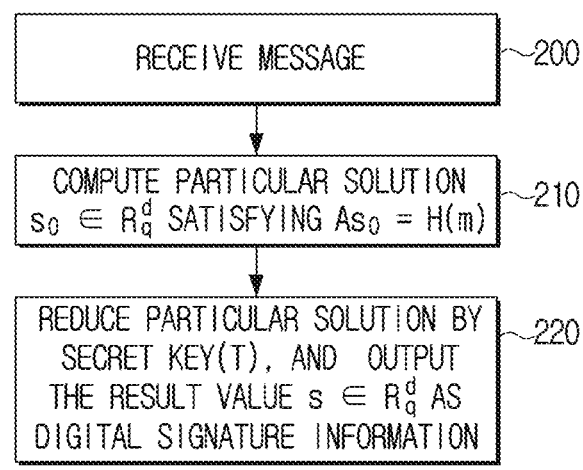
FIG. 2 is a flowchart showing an operation of generating a digital signature using the secret key according to the disclosure.

FIG. 2 is a flowchart showing an operation of generating a digital signature using the secret key according to the disclosure.

Referring to FIG. 2, a message (m) to be digitally signed is received (200).

It is possible to compute a particular solution in which a result of calculating the particular solution in the public key becomes a function-processed output value predetermined in the received message (210). In detail, it is possible to compute a particular solution $s_Q \in R_Q^d$ satisfying $As_Q = H(m)$. Here, the particular solution may be computed using, Gaussian elimination for example. In addition, the public key may be a key computed using a ring having a dimension (d) represented by a power of 2 and an integer multiplication of 3 or more.

The digital signature information for the message may then be generated using the computed particular solution (220). In detail, the particular solution $s_0$ may be reduced using a secret key (T), and then its result value $s \in R_q^d$ may be output as the digital signature information of the message (m). Such digital signature information may satisfy $As = H(m)$ as described above.

Here, a reduction process may be a process of sampling a small discrete normal distribution centered on s computed in the operation of S200 on a set {s: As=0} using the secret key (T). In detail, it is possible to select a standard deviation (σ), compute (c) by a Gaussian Sampler, to compute a small solution (s=($s_0$, $s_1$, ..., $s_{d-1}$)) in which the multiplication of the small solution and the second random matrix becomes a hash value, and to output s among the computed small solution as the above-described digital signature information.

The digital signature information may be generated by the user terminal 10 to which the message is to be transmitted, and this digital signature information may be verified by the digital signature verification server 40. FIG. 5 shows that the digital signature verification server 40 verifies the digital signature. However, a recipient's terminal which receives the message (m) may also verify the digital signature, and the scope of the disclosure is not limited to a subject performing the verification.

Figure 3:
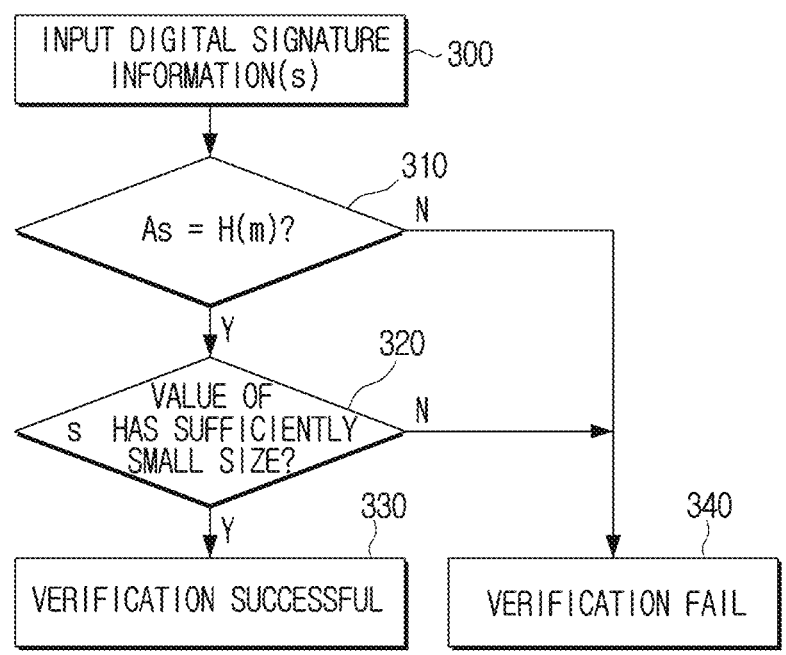
FIG. 3 is a flowchart showing a message verification process using generated digital signature information according to the disclosure.

FIG. 3 is a flowchart showing a message verification process using generated digital signature information according to the disclosure.

Referring to FIG. 3, the subject performing the digital signature verification (e.g., digital signature verification server 40 or terminal which receives the message (m)) may first receive the digital signature information (s) (300). Here, the subject may receive the message (m) together. Here, the message may be received from the device transmitting the digital signature information, or from another subject.

It may then be checked whether a result of calculating the digital signature information received in the public key becomes a function-processed output value predetermined in the message (310). In detail, the subject performing the digital signature verification may determine whether the result satisfies As=H(m). Here, s is the digital signature information, H( ) is the predetermined function-processing, and may be a hash processing for example, and m is the message. In addition, A is the public key, which may be computed using a ring having a dimension (d) represented by a power of 2 and an integer multiplication of 3 or more.

It may then be determined whether the received digital signature information has a value smaller than a predetermined parameter (320). That is, it may be determined whether the digital signature information s has a sufficiently small size. Here, the predetermined parameter may be determined in consideration of a probability of failure in verifying a size-comparison object of the digital signature information (s), stability, etc.

The received message may be verified based on the check result and the determination result. For example, if both the conditions are satisfied, it may be determined that the digital signature verification is successful (330), and if not, it may be determined that the verification is failed (340).

Meanwhile, the embodiments show and describe that it is first checked whether the computation formula is established, and the sizes of the digital signature information and predetermined parameter may then be compared with each other. However, the method may be implemented in such a way that the sizes of the digital signature information and predetermined parameter may first be compared with each other and whether the calculation formula is established may then be checked.

The above-described methods shown in FIG. 2 or 3 may reduce the calculation amount or the calculation time, which is required to generate the key because it is possible to use the dimension represented by the power of 2 and the integer multiplication without the need to double the dimension to increase security of the key.

Meanwhile, the above-described methods shown in FIG. 2 or 3 may be implemented as a program code performing each step, and may be stored in a recording medium and also be distributed. In this case, a device mounting the recording medium thereon may perform the above-described operations of the encryption method.

This recording medium may be one of various types of computer-readable media such as a read-only memory (ROM), a random access memory (RAM), a memory chip, a memory card, an external hard drive, a hard drive, a compact disk (CD), a digital versatile disk (DVD), a magnetic disk or a magnetic tape.

Meanwhile, FIGS. 2 and 3 show and describe that the digital signature information for the message is generated, and the operation of verifying the message is then performed using the generated digital signature information. However, the method may also be implemented in such a way that the digital signature information for the encrypted message is generated, that is, the digital signature for the encrypted text is generated and an operation of verifying the encrypted text is performed.

Figure 6:
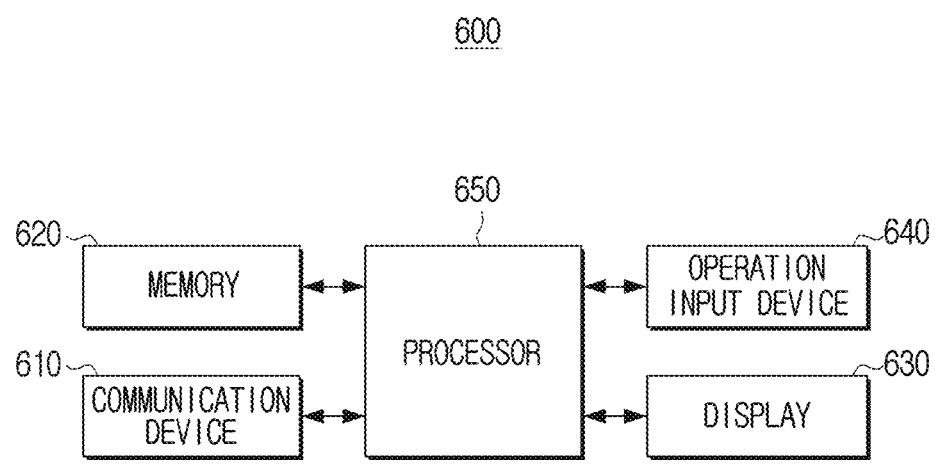
FIG. 6 is a block diagram showing a configuration of a calculation device according to an embodiment of the disclosure.

FIG. 6 is a block diagram showing a configuration of a calculation device according to an embodiment of the disclosure.

In detail, the calculation device may be referred to as a device that performs the encryption such as the user terminal, a device that generates a key required to generate the encrypted text such as the key generation server, and a device that uses the encrypted text, in the system of FIG. 5. Such a calculation device may be various devices such as a personal computer (PC), a laptop computer, a smartphone, a tablet or a server.

Referring to FIG. 6, a calculation device 600 may include a communication device 610, a memory 620, a display 630, an operation input device 640 and a processor 650.

The communication device 610 may be formed to connect the calculation device 600 to an external device (not shown), and may be connected to the external device through a local area network (LAN) and the internet network or be connected to the external device through a universal serial bus (USB) port or a wireless communication (for example, wireless fidelity (WiFi) 802.11a/b/g/n, near field communication (NFC) or BlueTooth) port. This communication device 610 may also be referred to as a transceiver.

The communication device 610 may receive various keys required to generate the encrypted text. For example, when generating a key, the communication device 610 may receive three parameters (n, q and d). Here, n is a value multiplied by the power of 2 representing the dimension, and d is an integer. Therefore, $2^n * d$ may be the dimension of the ring generated by the corresponding parameter, and q is a decimal value. Various keys may also be input through the operation input device 640.

In addition, the communication device 610 may transmit its own generated key to the external device. Here, the key may be a public key, a secret key, etc.

In addition, the communication device 610 may receive a message from the external device, and may transmit the generated encrypted text and/or digital signature information on to the external device.

In addition, the communication device 610 may receive various parameters required to generate the key or the encrypted text from the external device. Meanwhile, the various parameters may be implemented to be directly input from the user through the operation input device 640 to be described below.

In addition, the communication device 610 may receive the encrypted text. Here, the communication device 610 may receive the digital signature information for the encrypted text (or message) together.

The memory 620 is a component for storing an operating system (OS), various software, data and the like for driving the calculation device 600. The memory 620 may be implemented in various types of devices such as a random access memory (RAM), a read-only memory (ROM), a flash memory, a hard disk drive (HDD), external memory, memory card or the like, and is not limited thereto.

The memory 620 may store the identity information (or user information). Here, the identity information may be a social security number, an email address, a phone number, fingerprint information, iris information or the like, and may be used in case that a user secret key or the encrypted text is generated.

In addition, the memory 620 may store a message to be encrypted. Here, the message may be various types of credit information and personal information cited by the user, and may also be information related to a usage history, such as location information, information on time spent using the internet and the like, which are used in the calculation device 600.

In addition, the memory 620 may store the public key, and may store the public key and the various parameters required to generate the secret key as well as the secret key in case that the calculation device 600 is a device that directly generates the public key.

The memory 620 may also store the encrypted text and/or the digital signature information, generated in a process described below. The memory 620 may also store intermediate data and the like during the generation of the encrypted text and/or the digital signature information.

The memory 620 may also store the encrypted text transmitted from the external device. In addition, the memory 620 may also store the message which is a result of decrypting the encrypted text. In addition, the memory 620 may store the digital signature information transmitted from the external device.

The display 630 may display a user interface window for the user to select a function supported by the calculation device 600. For example, the display 630 may display the user interface window for the user to select various functions provided by the calculation device 600. The display 630 may be a monitor such as a liquid crystal display (LCD), organic light emitting diodes (OLED) or the like, and may be implemented as a touch screen which may simultaneously perform a function of the operation input device 640 to be described below.

The display 630 may display a message requesting for the user to input the parameters required to generate the secret key and the public key. The display 630 may also display a user interface (UI) requesting the user to select a message of an encryption target. For example, the display 630 may display the UI for the user to select user identity information to be used for the identity-based encryption based on a lattice.

Meanwhile, the encryption target may be implemented to be directly selected by the user or automatically selected. That is, personal information required to be encrypted may be automatically determined even though the user does not directly select the message.

The operation input device 640 may receive a function selection of the calculation device 600 and a command for controlling the corresponding function from the user. For example, the operation input device 640 may receive the parameters required to generate the secret key and the public key from the user. In addition, the operation input device 640 may receive the determined message to be encrypted from the user.

The processor 650 may control each component in the calculation device 600. The processor 650 may be configured of a single device such as a central processing unit (CPU) or an application-specific integrated circuit (ASIC), or may be configured of a plurality of devices such as the CPU, a graphics processing unit (GPU), etc.

If a message to be transmitted is input, the processor 650 may store the message in the memory 620. The processor 650 may encrypt the message by using a variety of determined values and programs stored in the memory 620. In this case, the public key may be used.

The processor 650 may generate and use the public key required to perform the encryption on its own, or may use the public key received from the external device. For example, the key generation server 20 performing the decryption may distribute the public key to another device.

In case that the key generation server 20 generates the public key on its own, the processor 650 may generate the first random matrix (S) and the second random matrix (A), which are shown in FIG. 5, to be generated, and the public key based on the second random matrix.

In case that the public key is generated, the processor 650 may control the communication device 610 to transmit the key to another device.

The processor 650 may also generate the encrypted text for the message. For example, in case that the identity information is input, the processor 650 may generate the function-processed output value by function-processing the input identity information. In addition, the processor 650 may randomly sample the small elements, and generate the encrypted text for the message by using the sampled small elements, the function-processed output value and the public key.

In addition, the processor 650 may store the generated encrypted text in the memory 620, and may control the communication device 610 to transmit the same encrypted text to another device based on a user request or a predetermined default command.

The processor 650 may generate the digital signature information for an encrypted text or a message. For example, the processor 650 may compute a particular solution in which a result of calculating the particular solution in the public key becomes a function-processed output value predetermined in the message, and generate the digital signature information for the message by using the calculated particular solution.

The processor 650 may also decrypt the encrypted text by using the user secret key. In addition, when receiving the message and the digital signature information, the processor 650 may verify the message using the received digital signature information. In detail, the processor 650 may verify the received message (or encrypted text) by checking whether the result of calculating the received digital signature information in the public key becomes the function-processed output value predetermined in the message and by determining whether the received digital signature information has a value smaller than a predetermined parameter.

As described above, the calculation device according to the disclosure may perform the encryption processing using a ring having a dimension represented by a power of 2 and an integer multiplication of 2 or more. The calculation amount or the calculation time, which is required to generate the key, may be reduced because it is possible to use the dimension represented by the power of 2 and the integer multiplication without the need to double the dimension to increase security of the key.

Meanwhile, FIG. 6 shows and describes that one device performs both the encryption and decryption operations, but the one device may be implemented to perform one operation, for example, only one of the key generation operation, the encryption operation and the decryption operation.

Although the disclosure has been described with reference to the accompanying drawings, the scope of the disclosure is not construed as being limited to the described embodiments and/or drawings, but is defined by the appended claims. In addition, it is to be clearly understood that the improvements, changes and modifications of the disclosure as described in the claims, which are obvious to those skilled in the art, are included in the scope of the disclosure.

What is claimed is:

1. A method of generating a digital signature comprising:
receiving a message;
computing a particular solution in which a result of calculating the particular solution in a public key becomes a function-processed output value predetermined in the received message;
generating digital signature information for the message using the computed particular solution,
wherein the public key is computed using a ring having a dimension (d) represented by a power of 2 and an integer multiplication of 3 or more; and
computing a first random matrix (S) in which the number of columns is smaller than the dimension by 1 and the number of rows is equal to the number of the dimension by sampling elements ($\vec{f}_i$) linearly independent from each other in the ring;
computing a second random matrix (A) in which the number of columns is equal to the number of the dimension and the number of rows is 1; and
computing the public key based on the second random matrix (A).

2. The method of claim 1, wherein in the generating of the digital signature information, the digital signature information is generated by reducing the computed particular solution using a secret key.

3. The method of claim 1, further comprising:
computing a trapdoor (T); and
determining the computed trapdoor (T) as a secret key.

4. The method of claim 1, wherein in the computing of the second random matrix, a d×d matrix ($M_i$) is computed by excluding an i-th row from a matrix $[\vec{f}_1 \ldots \vec{f}_{d-1}] \in R_q^{d \times (d-1)}$, and $(-1)^{i-1} \cdot \det(M_i)$ is determined as a determinant ($a_i$), thereby computing $a_1^{-1} \cdot (a_1, a_2, \ldots, a_d)$ as the second random matrix.

5. The method of claim 4, wherein the computing of the trapdoor (T) includes sampling of vector ($\vec{F} \in R_q^d$) that satisfies the relationship of $\det[\vec{f}_1 \| \ldots \| \vec{f}_{d-1} \| \vec{F}] \in = q$, in which $[\vec{f}_1 \| \ldots \| \vec{f}_{d-1} \| \vec{F}]$ is computed as the trapdoor (T).

6. The method of claim 5, wherein in the sampling of the vector, a result vector value is output after reducing elements of the vector by using the elements ($\vec{f}_i$).

7. The method of claim 6, wherein in the sampling of the vector, the elements of the vector are reduced by removing a direction component of the elements by subtracting a constant multiple of the elements ($\vec{f}_i$) from the elements ($\vec{F} = (F_1, \ldots, F_d)$) of the vector.

8. The method of claim 6, wherein in the sampling of the vector, the elements of the vector are reduced using an extended Euclidean algorithm.

9. The method of claim 1, wherein the predetermined function-processing is a hash processing.

10. A method of verifying a message comprising:
receiving a message and digital signature information;
checking whether a result of calculating the digital signature information received in a public key becomes a function-processed output value predetermined in the message;
determining whether the received digital signature information has a value smaller than a predetermined parameter;
verifying the received message based on the check result and the determination result,
wherein the public key is computed using a ring having a dimension (d) represented by a power of 2 and an integer multiplication of 3 or more; and
computing a first random matrix (S) in which the number of columns is smaller than the dimension by 1 and the number of rows is equal to the number of the dimension by sampling elements ($\vec{f}_i$) linearly independent from each other in the ring;
computing a second random matrix (A) in which the number of columns is equal to the number of the dimension and the number of rows is 1; and
computing the public key based on the second random matrix (A).

11. The method of claim 10, wherein the predetermined function-processing is a hash processing.

12. A calculation device comprising:
a memory storing at least one instruction; and
a processor performing the at least one instruction,
wherein the processor computes a particular solution in which a result of calculating the particular solution in a public key becomes a function-processed output value predetermined in a message, and generates digital signature information for the message using the computed particular solution,
the public key is computed using a ring having a dimension (d) represented by a power of 2 and an integer multiplication of 3 or more, and
the processor computes a first random matrix (S) in which the number of columns is smaller than the dimension by 1 and the number of rows is equal to the number of the dimension by sampling elements ($\vec{f}_i$) linearly independent from each other in the ring;
the processor computes a second random matrix (A) in which the number of columns is equal to the number of the dimension and the number of rows is 1; and
the processor computes the public key based on the second random matrix (A).

13. The calculation device of claim 12, wherein the processor reduces the computed particular solution using a secret key, and generates the digital signature information by using the reduced particular solution.

14. The calculation device of claim 12, wherein receiving the message and the digital signature information, the processor checks whether a result of calculating the digital signature information received in a public key becomes a function-processed output value predetermined in the message, determines whether the received digital signature information has a value smaller than a predetermined parameter, and verifies the received message based on the check result and the determination result.

15. A non-transitory computer-readable recording medium comprising a program performing a method of generating a digital signature, wherein the method comprising:

receiving a message;

computing a particular solution in which a result of calculating the particular solution in a public key becomes a function-processed output value predetermined in the received message;

generating digital signature information for the message using the computed particular solution, wherein the public key is computed using a ring having a dimension (d) represented by a power of 2 and an integer multiplication of 3 or more; and computing a first random matrix (S) in which the number of columns is smaller than the dimension by 1 and the number of rows is equal to the number of the dimension by sampling elements ( )linearly independent from each other in the ring;

computing a second random matrix (A) in which the number of columns is equal to the number of the dimension and the number of rows is 1; and computing the public key based on the second random matrix (A).

* * * * *